US006924840B1

(12) United States Patent
Furuhata

(10) Patent No.: US 6,924,840 B1
(45) Date of Patent: Aug. 2, 2005

(54) COLOR IMAGE CAPTURING DEVICE AND IMAGE READER USING THE COLOR IMAGE CAPTURING DEVICE

(75) Inventor: Fujio Furuhata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/335,518

(22) Filed: Jun. 18, 1999

(30) Foreign Application Priority Data

Jun. 24, 1998 (JP) ............................................ 10-177883
Jan. 19, 1999 (JP) ............................................ 10-010431

(51) Int. Cl.⁷ ........................ H04N 5/247; H04N 5/335; H04N 1/46
(52) U.S. Cl. ........................ 348/264; 348/274; 348/275; 358/514
(58) Field of Search ................................ 348/262, 264, 348/275, 274, 308, 272, 273; 250/208.1; 358/513, 514

(56) References Cited

U.S. PATENT DOCUMENTS

| 4,432,017 A |   | 2/1984  | Stoffel et al.           |
|-------------|---|---------|--------------------------|
| 4,438,457 A |   | 3/1984  | Tandon et al.            |
| 4,712,137 A | * | 12/1987 | Kadekodi et al. ... 348/316 |
| 5,452,001 A | * | 9/1995  | Hosier et al. ...... 348/302 |
| 5,483,359 A |   | 1/1996  | Yumiba et al.            |
| 5,801,850 A | * | 9/1998  | Maki et al. ......... 348/311 |
| 5,859,712 A | * | 1/1999  | Kim ................. 358/504 |
| 6,166,831 A | * | 12/2000 | Boyd et al. .......... 358/483 |
| 6,559,981 B1| * | 5/2003  | Aoki ............... 358/505 |

FOREIGN PATENT DOCUMENTS

| EP | 0 070 620 A2 |   | 1/1983 |          |
|----|--------------|---|--------|----------|
| EP | 0 663 763 A2 |   | 7/1995 |          |
| EP |   0663763 A2 | * | 7/1995 | H04N/3/15 |
| EP | 0 703 702 A2 |   | 3/1996 |          |
| EP |   0703702 A2 | * | 3/1996 | H04N/3/15 |
| EP | 0 776 123 A2 |   | 5/1997 |          |
| JP | 57-15481     |   | 1/1982 |          |
| JP | 57-141178    |   | 9/1982 |          |
| JP | 58-1381      |   | 1/1983 |          |
| JP | 58-19081     |   | 2/1983 |          |
| JP | 59-153386    |   | 9/1984 |          |
| JP | 3-99574      |   | 4/1991 |          |
| JP | 7-30725      |   | 1/1995 |          |
| JP | 7-111561     |   | 4/1995 |          |
| JP | 7-273941     |   | 10/1995|          |
| JP | 07-273941    | * | 10/1995| H04N/1/028 |
| JP | 8-84218      |   | 3/1996 |          |
| JP | 9-205520     |   | 8/1997 |          |
| JP | 9-271030     |   | 10/1997|          |

OTHER PUBLICATIONS

Yuji Kinchi; "Image Input Technical Hand Book" Mar. 31, 1992; Nikkan Kogyo Press.
Yuzuki L. et al.; "A 5732–Element Linear CCD Image Sensor" IEEE Transactions on Electron Devices, IEEE Inc. New York, US, vol. ED–32, No. 8, Aug. 1, 1985; pp. 1541–1545.

* cited by examiner

Primary Examiner—Andrew Christensen
Assistant Examiner—Lin Ye
(74) Attorney, Agent, or Firm—Sughrue Mion, PLLC

(57) ABSTRACT

A color image capturing device provided with groups of two rows of photoelectric conversion elements for each color of R, G and B is mounted on a carriage and planar color images are read by moving the carriage in a sub scanning direction. As each first row of photoelectric conversion elements and each second row of photoelectric conversion elements are offset from each other by an amount equivalent to a half of the width of an individual element in a main scanning direction, and resolution in the main scanning direction is enhanced. As each row of photoelectric conversion elements is arranged at pitch equivalent to the height of four rows, all the rows of photoelectric conversion elements can read the same line, even if the carriage is moved at speed twice or four times as fast as that in reading at 600 dpi to read at the resolution of 300 dpi or 150 dpi in the sub scanning direction at high speed in case the reading resolution of each row of photoelectric conversion elements is 600 dpi.

19 Claims, 3 Drawing Sheets

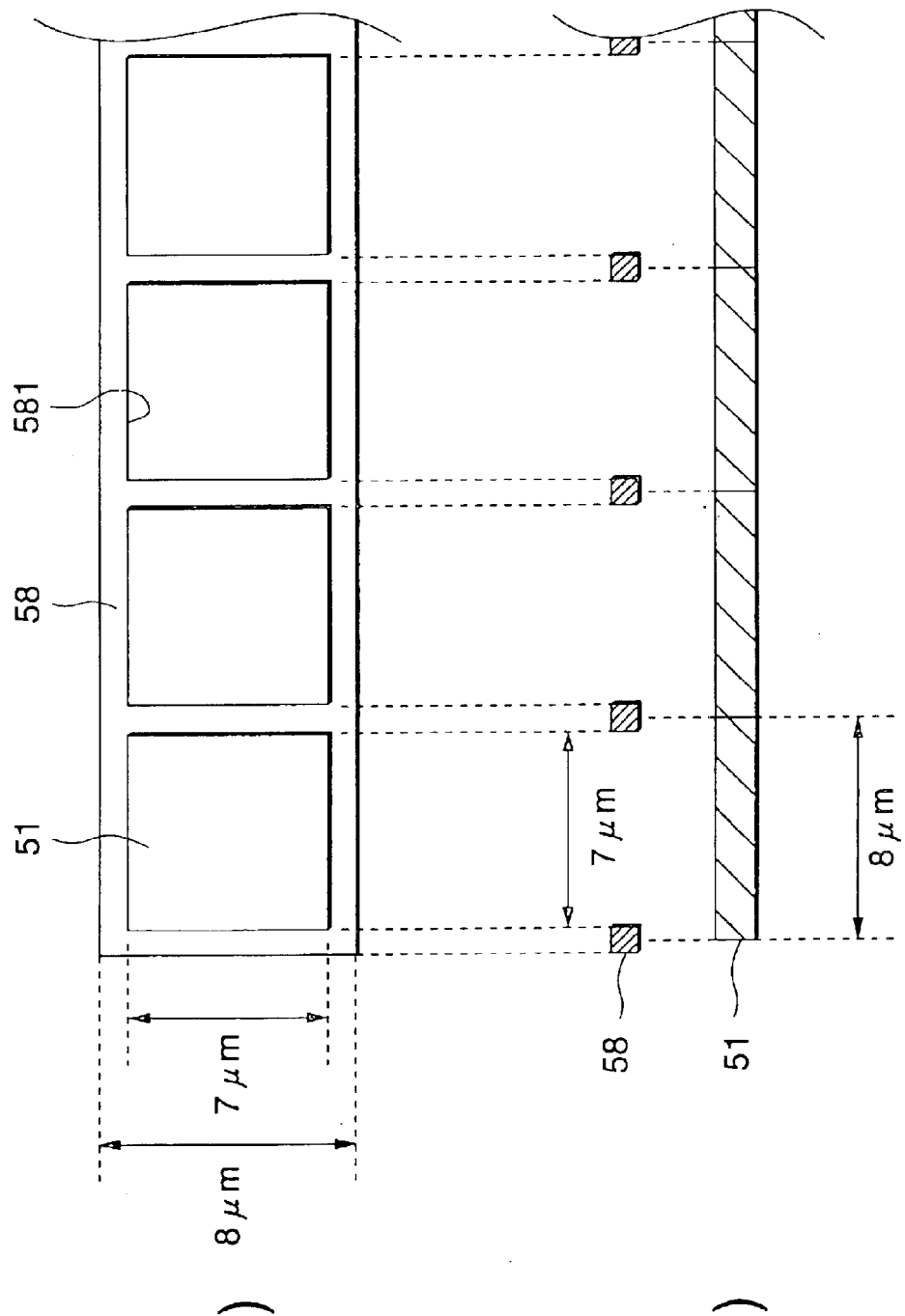

COLOR IMAGE CAPTURING DEVICE AND IMAGE READER USING THE COLOR IMAGE CAPTURING DEVICE

BACKGROUND OF THE INVENTION

1. Field of the Invention

The present invention relates to a color image capturing device used for an image reader and other similar devices.

2. Description of the Related Art

Image readers for moving a carriage supporting a color image capturing device, and for reading an image on a manuscript, are known. The image readers include multiple image sensing elements, which are aligned with each other on a color image capturing device, and three line sensors for respectively reading three primary colors, such as a CCD in parallel with the surface of a manuscript.

For example, in the case of a flat-bed image reader, a manuscript table, composed of a glass transparent plate for placing a manuscript on the upper surface of a box cabinet, is provided and inside the cabinet, a carriage moved in parallel with the manuscript table by a drive unit is provided. A light source and the color image capturing device are mounted on the carriage. Illuminating light from the light source is reflected by the surface of a manuscript on the manuscript table and focused on the color image capturing device by a condenser lens.

In the above image reader, to enhance reading resolution in a main scanning direction, equivalent to a direction in which the image sensing elements of the CCD are arranged, the number of the image sensing elements, constituting the CCD, is increased. However, this increase results in the increase in the size of the CCD, an increase in the load in designing an optical system, and an increase in the cost of the image reader. However, if each element is miniaturized, manufacturing possibilities are limited.

Japanese published unexamined patent application No. Sho58-19081 discloses a CCD image sensor, provided with photodetectors in a first row and photodetectors in a second row, where the second row of photodetectors is offset or shifted with respect to the first row of photodetectors by an amount which is equivalent to approximately a half of the width of an individual photodetector. In the CCD image sensor, the photodetectors in the first row and the photodetectors in the second row are arranged adjacent to each other in a sub scanning direction.

However, as disclosed in the Japanese published unexamined patent application No. Sho58-19081, if a CCD image sensor, in which photodetectors in a first row are arranged closely adjacent to the photodetectors in a second row in a sub scanning direction is used, a carriage is required to be moved by the height of the photodetector at every reading of one line for the photodetectors in the first row and the photodetectors in the second row to read the same line on a manuscript.

Generally, in an image reader, reading resolution in a sub scanning direction is determined by the time required for photodetectors in each row to read one line and the traverse speed of a carriage. Therefore, in reading at low resolution in a sub scanning direction, a carriage is moved at high speed.

However, image readers provided with a CCD image sensor in which photodetectors in a first row are arranged in close contact or in close proximity to the photodetectors in a second row in a sub scanning direction, cannot perform a precise reading operation of a manuscript. More particularly, in such an image reader, when the carriage is moved at high speed, if a manuscript is read at high resolution in a main scanning direction, and is read at low resolution in a sub scanning direction, a problem arises in that lines to be read by photodetectors in the first row and photodetectors in the second row are different which prevents a precise reading of the image. This problem arises because the arrangement of the photodetectors, in the first and second rows of photodetectors, in a sub scanning direction is not considered; that is, an interval between the photodetectors in the first and second rows is not considered. Therefore, in an image reader provided with the CCD image sensor disclosed in the Japanese published unexamined patent application No. Sho58-19081, if an image is read at low resolution in a sub scanning direction, the carriage must be moved at low speed to read an image precisely, as compared to when an image is read at high resolution, and therefore, it takes a long time to perform a read operation.

SUMMARY OF THE INVENTION

The present invention was designed to solve the above problems. An object of the present invention is to provide a color image capturing device wherein resolution in a main scanning direction is enhanced and reading at low resolution in a sub scanning direction is executed at high speed.

According to the present invention, each row of image sensing elements, in a group of image sensing elements corresponding to each color, is offset or shifted from adjacent rows of image sensing elements, by an amount which is smaller than the width of an individual image sensing element in a direction in which the image sensing elements are arranged. According to this arrangement, a manuscript can be read at high resolution in the direction in which the image sensing elements are arranged, that is, in a main scanning direction. A plurality of rows of image sensing elements are mutually arranged at a pitch exceeding twice the height of an individual image sensing element in a direction perpendicular to a direction in which the image sensing elements are arranged. According to this arrangement, all rows of the image sensing elements can read the same line on a manuscript, even if a color image capturing device is moved at high speed, or twice the usual speed, when the color image capturing device is moved relative to the manuscript in a sub scanning direction perpendicular to a main scanning direction, and high-speed reading at low resolution is enabled.

According to another aspect of the present invention, a color image capturing device includes groups of image sensing elements which are respectively provided for red (R), green (G) and blue (B) colors, such that a manuscript can be read with light from the manuscript resolved into three primary colors.

According to another aspect of the present invention, a color image capturing device includes a group of image sensing elements which are composed of a first row of elements and a second row of elements, where the first row of elements and the second row of elements are mutually arranged with each row offset or shifted from another row by an amount equivalent to approximately half the width of an individual image sensing element, and reading resolution in a main scanning direction is doubled.

According to yet another aspect of the present invention, a color image capturing device includes a shielding part provided with a smaller opening than the light receiving area of each image sensing element for shielding the periphery of the image sensing element from light. A range of a manuscript read by the plurality of image sensing elements in common is reduced, and reading resolution can be substantially enhanced.

According to another aspect of the invention, an image reader is provided with the color image capturing device described above such that resolution in a main scanning direction can be enhanced and reading in a sub scanning direction at low resolution can be executed at high speed.

BRIEF DESCRIPTION OF THE DRAWINGS

The present invention will be described with reference to the drawings in which:

FIGS. 4(A) and 4(B) are a plan view and a sectional side view respectively showing a row of image sensing elements of a color image capturing device according to a second embodiment of the present invention.

DETAILED DESCRIPTION OF THE PREFERRED EMBODIMENTS

First Embodiment

Figure 2:
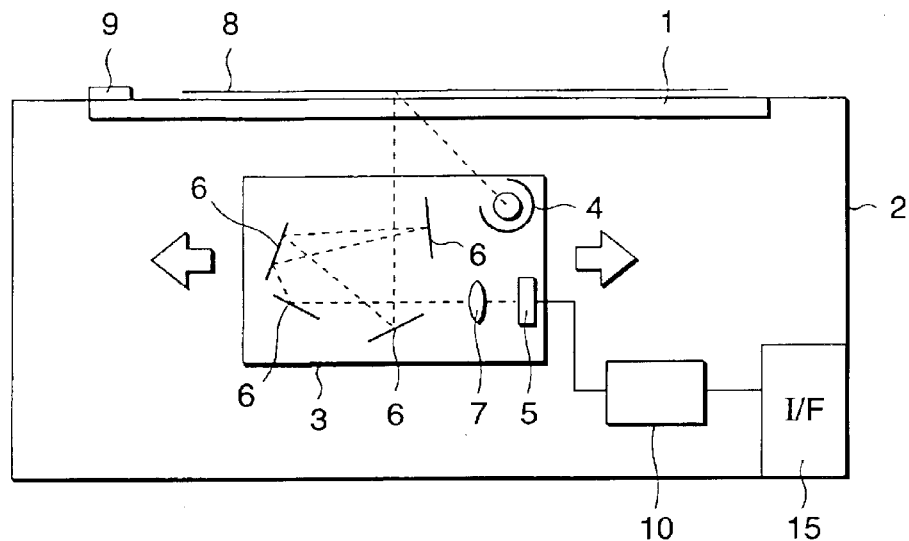
FIG. 2 is a schematic drawing showing an image reader to which the color image capturing device of the first embodiment of the present invention is applied.

FIG. 2 is a schematic drawing showing a flat-bed image reader of a carriage moving type for implementing a first embodiment of the present invention.

A manuscript table 1 composed of a glass transparent plate is provided on the upper surface of box cabinet 2. Inside the cabinet 2, a carriage 3, which can be reciprocated in parallel with the manuscript table 1 by a driving unit (not shown), is provided. A light source 4 and a color image capturing device 5 are mounted on the carriage 3. After light emitted from the light source 4 is reflected on the surface of a manuscript 8 on the manuscript table 1 and reflected by a plurality of mirrors 6, the light is focused on the color image capturing device 5 by a condenser lens 7. The color image capturing device 5 respectively converts red light (R), green light (G) and blue light (B) to electric information and outputs corresponding electrical signals. The optical path length between the manuscript 8 and the condenser lens 7 is extended by reflecting the light by the mirrors 6. A white criterion 9 is provided at the end of the manuscript table 1. The white criterion 9 is provided with a uniform reflecting surface having high reflectance.

An image on the manuscript 8 can be read by detecting the electrical signals output from the color image capturing device 5 when the carriage 3 is moved in a sub scanning direction, and by transmitting the signals to an external image processing unit via an interface 15 after processing the electrical signals in a signal processing section 10.

Figure 1:
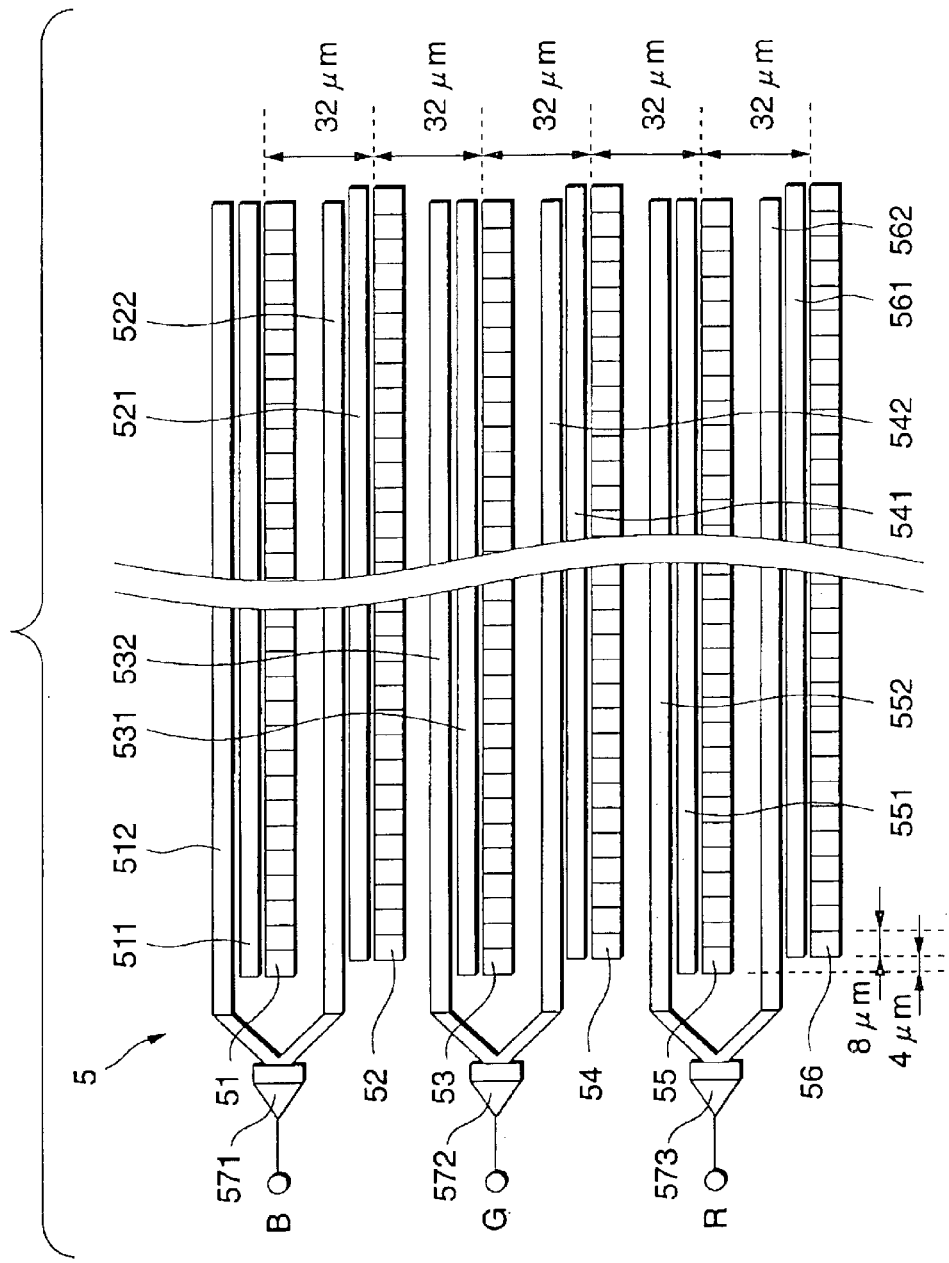
FIG. 1 is a schematic drawing showing a color image capturing device according to a first embodiment of the present invention.

FIG. 1 is a schematic drawing showing the color image capturing device 5 in this embodiment. The color image capturing device 5 is provided with groups of image sensing elements for reading respective light of R, G and B. Each group of image sensing elements includes two rows of image sensing elements, such as photoelectric conversion elements, composed of a first row 51, 53 or 55 of photoelectric conversion elements as a first row of elements composed by linearly arranging a plurality of image sensing elements in a direction perpendicular to the direction of the movement of the carriage, and a second row 52, 54 or 56 of photoelectric conversion elements as a second row of elements. In this embodiment, each image sensing element is a square 8 $\mu$m×8 $\mu$m in size, and the height of each row of photoelectric conversion elements is 8 $\mu$m. In each group of image sensing elements, the first row 51, 53 or 55 of photoelectric conversion elements and the second row 52, 54 or 56 of photoelectric conversion elements are offset or shifted with respect to each other by 4 $\mu$m, which is equivalent to a half of the width of an individual image sensing element in a main scanning direction.

In each group of image sensing elements, the first row 51, 53 or 55 of photoelectric conversion elements and the second row of photoelectric conversion elements 52, 54 or 56 are arranged at the pitch of 32 $\mu$m, which is equivalent to four times the height of each image sensing element; that is, equivalent to the height of four rows of photoelectric conversion elements. The second row 52 of photoelectric conversion elements in the group of image sensing elements for detecting blue light B and the first row 53 of photoelectric conversion elements in the group of image sensing elements for detecting green light G are arranged at a pitch which is equivalent to the height of four rows of photoelectric conversion elements, and the second row 54 of photoelectric conversion elements in the group of image sensing elements for detecting green light G and the first row 55 of photoelectric conversion elements in the group of image sensing elements for detecting red light R are arranged at a pitch which is equivalent to the height of four rows of photoelectric conversion elements. Therefore, six rows 51 to 56 of photoelectric conversion elements are arranged at an equal interval from each adjacent row of photoelectric conversion elements by a pitch which is equivalent to the height of four rows of photoelectric conversion elements.

Charge stored in each row of photoelectric conversion elements is respectively transmitted to shift registers 512, 522, 532, 542, 552 and 562 via transmission gates 511, 521, 531, 541, 551 and 561 in synchronization with a driving signal generated at a predetermined interval. In each row of photoelectric conversion elements, the storage of charge by light from the next reading line is started and charge transmitted to each shift register is sequentially respectively output from output terminals 571, 572 and 573.

In this embodiment, each row of photoelectric conversion elements is assembled so that the manuscript 8 can be read at the resolution of 600 dots per inch (dpi) in the main scanning direction. Therefore, in the color image capturing device 5 in this embodiment, one line can be read at the resolution of 1200 dpi by synthesizing each data of R, G and B read by the first rows 51, 53 and 55 of photoelectric conversion elements and each data of R, G and B read by the second rows 52, 54 and 56 of photoelectric conversion elements in respective positions in which the carriage 3 is moved by the height of four rows of photoelectric conversion elements.

Figure 3:
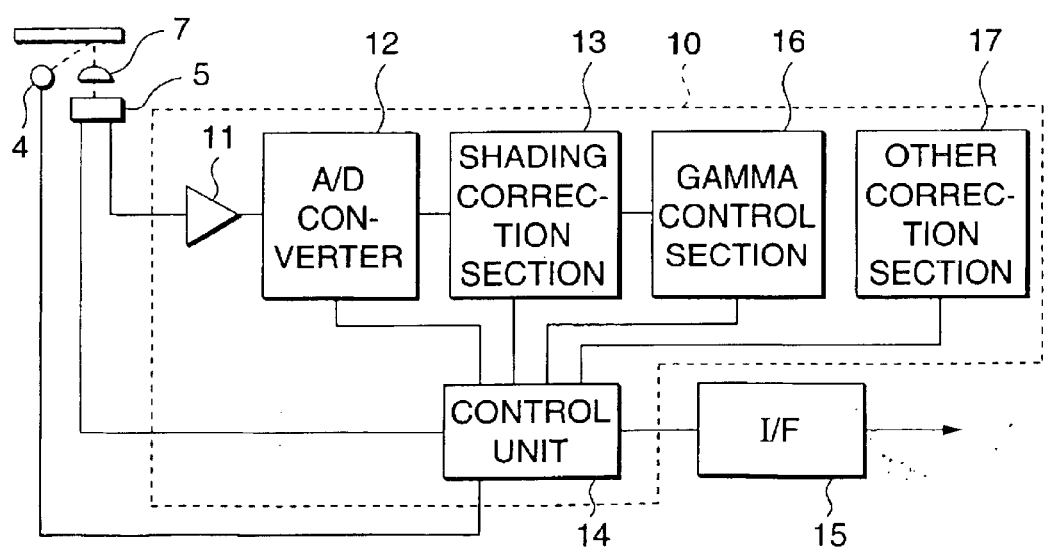
FIG. 3 is a block diagram showing a signal processing unit of the image reader to which the color image capturing device of the first embodiment of the present invention is applied.

Charge output from the color image capturing device 5 is processed by the signal processing unit 10 shown in FIG. 3. An analog to digital (A/D) converter 12 converts data input from the color image capturing device 5 via an amplifier 11 to a digital signal and outputs it to a shading correction section 13. The digital signal is a signal having a numerical value between 0 and 1023 when reading gradation is composed of 10 bits for example. The shading correction section 13 corrects dispersion in sensitivity and dispersion in the luminous energy of the light source every element in the row of photoelectric conversion elements using data acquired by reading the white criterion 9 before the start of reading. A gamma control section 16 executes gamma control using a predetermined gamma function and converts a luminous energy signal output from the shading correction section 13 to a picture signal. The other correction section 17 executes conversion in color correction, edge highlighting, the extension/reduction of an area and others.

Next, the operation of the image reader composed as described above will be described.

A user connects a personal computer (not shown) to the interface 15 of the image reader, places a manuscript 8 on the manuscript table 1, specifies a range of the manuscript to be read and reading resolution via the personal computer, and instructs the image reader to execute a reading operation.

When the image reader is instructed to perform a read operation, a control unit 14 lights the light source 4 and moves the carriage at a fixed speed in a direction perpendicular to a direction in which each element in each row of photoelectric conversion elements is arranged. Images on one line are read by each row of photoelectric conversion elements of the color image capturing device 5 according to a driving signal generated every predetermined time and output to the signal processing unit 10. Reading resolution in the sub scanning direction is determined by the time required for each row of photoelectric conversion elements to read one line and on the traverse speed of the carriage 3. For example, a manuscript can be read at the resolution of 600 dpi in the sub scanning direction by moving the carriage 3 by the height of one row of photoelectric conversion elements every time the carriage 3 reads one line of the manuscript 8.

In this embodiment, as each row of photoelectric conversion elements is arranged at a pitch equivalent to the height of four rows of photoelectric conversion elements in the sub scanning direction, all of the rows 51 to 56 of photoelectric conversion elements can read the same line, even if the carriage 3 is moved at a speed twice or four times as fast as that in reading at 600 dpi, because images are read at the resolution of 300 dpi or 150 dpi in a sub scanning direction at high speed when the resolution for reading the row of photoelectric conversion elements is 600 dpi. Therefore, when images are read at high resolution in the main scanning direction and read at low resolution in the sub scanning direction, the manuscript can be read at high speed.

Second Embodiment

FIGS. 4(A) and 4(B) show a row 51 of photoelectric conversion elements of a color image capturing device 5 according to a second embodiment of the present invention. FIG. 4(A) is a plan view and FIG. 4(B) is a sectional side view.

In this embodiment, a shielding part 58, provided with a smaller opening than the light receiving area of each element, for shielding the periphery of each element from light is provided on the side of the light receiving surface of each row of photoelectric conversion elements. FIGS. 4(A) and 4(B) show the shielding part 58 provided for the row 51 of photoelectric conversion elements. However, a shielding part is similarly provided to the other rows 52 to 56 of photoelectric conversion elements. The shielding part 58 is formed by a metallic plate and a square opening 581, having the dimensions of 7 $\mu$m×7 $\mu$m. The remaining structure of the second embodiment is similar to that in the first embodiment.

As a part read by a plurality of elements in common on a manuscript is reduced because the shielding part 58 shields the periphery of each element from light, substantial resolution can be enhanced. As sensitivity in the center of each element is higher than that in the periphery, the deterioration of sensitivity due to the reduction of light receiving area can be minimized.

In the above embodiments of the present invention, each row of photoelectric conversion elements is arranged at a pitch equivalent to the height of four rows, however, the rows can be arranged at a pitch equivalent to an arbitrary number of rows exceeding two rows. For example, when each row of photoelectric conversion elements is arranged at a pitch equivalent to the height of two rows, and if the rows of photoelectric conversion elements are reading at a resolution in the main scanning direction of 600 dpi, the carriage mounting the rows of photoelectric conversion elements is moved at a speed twice as fast as that when reading resolution in the sub scanning direction is 600 dpi. In addition, when images are read at the resolution of 300 dpi at high speed, each row of photoelectric conversion elements can read the same line on a manuscript. When images are read at the resolution of 200 dpi at high speed, if each row of photoelectric conversion elements is arranged at a pitch equivalent to the height of three rows, each row of photoelectric conversion elements can read the same line. When images are read at each resolution of 300 dpi, 200 dpi and 100 dpi at high speed, if each row of photoelectric conversion elements is arranged at a pitch equivalent to the height of six rows, each row of photoelectric conversion elements can read the same line. If rows of photoelectric conversion elements having another reading resolution are used or each row of photoelectric conversion elements are arranged at a pitch equivalent to another integer value times the height of one row of photoelectric conversion elements, each row can also similarly read the same line.

In the above embodiments, the image tube wherein resolution in the main scanning direction is enhanced up to approximately two times, by composing a group of image sensing elements, for each color of R, G and B, having two rows of photoelectric conversion elements where the first row of photoelectric conversion elements is offset or shifted from the second row of photoelectric conversion elements by approximately a half of the length of an individual element, is obtained by applying the present invention to the image tube. However, even if a group of image sensing elements for each color is composed of three or four rows or n rows of photoelectric conversion elements, where n is an integer having a value greater than two, the effect of the present invention of reading at low resolution at high speed in the sub scanning direction can be obtained by arranging each row of photoelectric conversion elements at an equal interval equivalent to the integer times the height of one row in the sub scanning direction. For example, if a group of photoelectric conversion elements is composed of three rows, resolution in the main scanning direction is enhanced up to approximately three times by arranging the first row of photoelectric conversion elements and the second row of photoelectric conversion elements offset by approximately ⅓ of the length of an individual element, and arranging the second row of photoelectric conversion elements and a third row of photoelectric conversion elements offset by approximately ⅓ of the length of an individual element. If a group of photoelectric conversion elements is composed of four rows, resolution in the main scanning direction can be also enhanced up to approximately four times by arranging each row offset from an adjacent row by approximately ¼ of the length of an individual element.

Also, in the above embodiments, one output terminal is provided corresponding to a group of image sensing elements of each color of R, G and B, however, one output terminal may be also provided for every row of photoelectric conversion elements.

Also, in the above embodiments, the present invention is applied to the flat-bed image reader of the carriage moving type, however, the present invention can be applied to a flat-bed image reader of a mirror moving type in which a color image capturing device and a condenser lens are fixed, and a light source and a group of reflectors are moved. The present invention can be also applied to another image reader such as a sheet feed type for moving a manuscript.

As described above, according to the present invention, the rows of image sensing elements are arranged in parallel at a pitch equivalent to at least twice the height of said image sensing element.

While the present invention has been described with reference to particular embodiments, it will be understood that various modifications may be made without departing from the spirit and scope of the invention.

What is claimed is:

1. A color image capturing device, comprising:
    a substrate; and
    a plurality of groups of image sensing elements, formed on said substrate, which respectively correspond to a plurality of colors;
    wherein each of said groups of image sensing elements comprises:
    a plurality of rows of image sensing elements, wherein image sensing elements in each of said plurality of rows are linearly arranged on said substrate;
    wherein each of said rows of image sensing elements is offset with respect to adjacent rows of image sensing elements by an amount which is smaller than the width of an image sensing elements in said plurality of rows of image sensing elements; and
    wherein said rows of image sensing elements are arranged in parallel at a pitch equivalent to at least four times the height of said image sensing element.

2. The color image capturing device according to claim 1, wherein said plurality of groups of image sensing elements respectively correspond to the colors of red, green and blue.

3. The color image capturing device according to claim 1, wherein each of said groups of image sensing elements comprises:
    a first row of image sensing elements; and
    a second row of image sensing elements;
    wherein said second row of image sensing elements is offset from said first row of image sensing elements by a predetermined amount which is equivalent to one half of the width of an image sensing element in said second row of image sensing elements.

4. The color image capturing device according to claim 2, wherein each of said groups of image sensing elements comprises:
    a first row of image sensing elements; and
    a second row of image sensing elements;
    wherein said second row of image sensing elements is offset from said first row of image sensing elements by a predetermined amount which is equivalent to one half of the width of an image sensing element in said second row of image sensing elements.

5. The color image capturing device according to claim 1, wherein a shield is provided on a light-receiving surface of image sensing elements in said plurality of groups of image sensing elements, said shield having an opening which is smaller than a light-receiving area of said image sensing elements for shielding a periphery of said image sensing elements from light.

6. The color image capturing device according to claim 2, wherein a shield is provided on a light-receiving surface of image sensing elements in said plurality of groups of image sensing elements, said shield having an opening which is smaller than a light-receiving area of said image sensing elements for shielding a periphery of said image sensing elements from light.

7. The color image capturing device according to claim 3, wherein a shield is provided on a light-receiving surface of image sensing elements in said plurality of groups of image sensing elements, said shield having an opening which is smaller than a light-receiving area of said image sensing elements for shielding a periphery of said image sensing elements from light.

8. The color image capturing device according to claim 4, wherein a shield is provided on a light-receiving surface of image sensing elements in said plurality of groups of image sensing elements, said shield having an opening which is smaller than a light-receiving area of said image sensing elements for shielding a periphery of said image sensing elements from light.

9. The color image capturing device according to claim 5, wherein said shielding part is formed by a metallic plate.

10. An image reader, comprising:
    a color image capturing device comprising:
    a substrate; and
    a plurality of groups of image sensing elements, formed on said substrate, which respectively correspond to a plurality of colors;
    wherein each of said groups of image sensing elements comprises:
    a plurality of rows of image sensing elements, wherein image sensing elements in each of said plurality of rows are linearly arranged on said substrate;
    wherein each of said rows of image sensing elements is offset with respect to adjacent rows of image sensing elements by an amount which is smaller than the width of an image sensing element in said plurality of rows of image sensing elements; and
    wherein said rows of image sensing elements are arranged in parallel at a pitch equivalent to at least four times the height of said image sensing element;
    a light source for irradiating a manuscript;
    a plurality of mirrors for reflecting light emitted from said light source and for reflecting light reflected from a surface of said manuscript; and
    a condenser lens for focusing said light reflected by said mirrors.

11. The color image capturing device according to claim 10, wherein said plurality of groups of image sensing elements respectively correspond to the colors of red, green and blue colors.

12. The color image capturing device according to claim 10, wherein each of said groups of image sensing elements comprises:
    a first row of image sensing elements; and
    a second row of image sensing elements;
    wherein said second row of image sensing elements is offset from said first row of image sensing elements by a predetermined amount which is equivalent to one half of the width of said an image sensing element in said second row of image sensing elements.

13. The color image capturing device according to claim 11, wherein each of said groups of image sensing elements comprises:

a first row of image sensing elements; and a second row of image sensing elements;

wherein said second row of image sensing elements is offset from said first row of image sensing elements by a predetermined amount which is equivalent to one half of the width of an image sensing element in said second row of image sensing elements.

14. The color image capturing device according to claim 10, wherein a shield is provided on a light-receiving surface of image sensing elements in said plurality of groups of image sensing elements, said shield having an opening which is smaller than a light-receiving area of said image sensing elements for shielding a periphery of said image sensing elements from light.

15. The color image capturing device according to claim 11, wherein a shield is provided on a light-receiving surface of image sensing elements in said plurality of groups of image sensing elements, said shield having an opening which is smaller than a light-receiving area of said image sensing elements for shielding a periphery of said image sensing elements from light.

16. The color image capturing device according to claim 12, wherein a shield is provided on a light-receiving surface image sensing elements in said plurality of groups of image sensing elements, said shield having an opening which is smaller than a light-receiving area of said image sensing elements for shielding a periphery of said image sensing elements from light.

17. The color image capturing device according to claim 13, wherein a shield is provided on a light-receiving surface of image sensing elements in said plurality of groups of image sensing elements, said shield having an opening which is smaller than a light-receiving area of said image sensing elements for shielding a periphery of said image sensing elements from light.

18. The color image capturing device according to claim 1, wherein said rows of image sensing elements are arranged in parallel at a pitch equivalent to four times the height of said image sensing element.

19. The image reader according to claim 10, wherein said rows of image sensing elements are arranged in parallel at a pitch equivalent to four times the height of said image sensing element.

* * * * *